United States Patent [19]

Hedman

[11] 3,812,575

[45] May 28, 1974

[54] ELECTRET MICROPHONE
[75] Inventor: Jan-Olof Hedman, Tyreso, Sweden
[73] Assignee: Telefonaktiebolaget LM Ericsson, Stockholm, Sweden
[22] Filed: Nov. 22, 1972
[21] Appl. No.: 308,832

[30] Foreign Application Priority Data
Dec. 2, 1971   Sweden.............................. 15456/71

[52] U.S. Cl............. 29/594, 29/592, 179/100.41 B, 179/111 E, 307/88 ET, 340/173.2
[51] Int. Cl............................................ H04r 31/00
[58] Field of Search .............. 29/592, 594; 317/262; 307/88 ET; 179/111 E, 100.41 B; 320/1; 340/173.2

[56] References Cited
UNITED STATES PATENTS
3,118,022   1/1964   Sessler et al. ................... 179/111 E
3,436,492   4/1969   Reedyk .......................... 179/111 E Primary Examiner—Charles W. Lanham
Assistant Examiner—Joseph A. Walkowski
Attorney, Agent, or Firm—Hane, Baxley & Spiecens

[57] ABSTRACT

The invention relates to a procedure for manufacture of an electret microphone comprising a fixed electrode and a movable electrode, the movable electrode comprising a first plastic film which is metallized and a second plastic film which is electro-statically polarized. According to the invention, there are a first processing stage in which the first and second plastic films are metallized and polarized respectively and a second processing stage in which the metallized plastic film, the polarized plastic film and the fixed electrode are assembled together.

2 Claims, 1 Drawing Figure

PATENTED MAY 28 1974
3,812,575
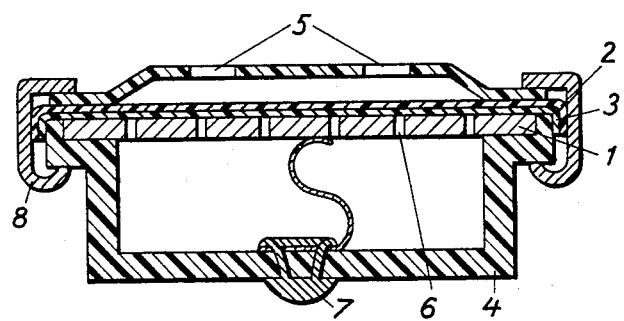

ELECTRET MICROPHONE

The invention relates to a process for the manufacture of an electret microphone comprising a fixed electrode and a movable electrode, the movable electrode comprising a first plastic film which is metallized and a second plastic film which is electrostatically polarized.

In the U.S. Pat. specification 3,436,492 an electret microphone of the above defined type is described which has a fixed electrode in the form of a field-controlled semiconductor element, above a control surface of which is placed an electret film functioning as a diaphragm. The side of the electret film remote from the semiconductor element is coated with a thin metal layer which constitutes the movable electrode of the microphone. Between the electret film and the semiconductor element there is a microscopic gap owing to irregularities in their facing surfaces. In this basic embodiment the electret microphone has a high capacitance between the fixed and the movable electrodes, which has the advantage of high sensitivity.

In the manufacture of the known electret microphone there are two successive steps for the processing of the electret film, namely metallization and electrostatic polarization. The order in which the two processing steps are performed cannot be reversed, as the metallization process would have the effect of neutralizing the polarization charges. It has proved, however, that the applied metal layer gives rise to a great risk of dielectric breakdown during the polarization process.

According to the invention this risk of dielectric breakdown is eliminated through the fact that, in the two processing steps, instead of using a single plastic film or electret film, two separate plastic films are used which are then combined into two cascade coupled diaphragms of the electret microphone. This has the further advantage that it is possible to choose separate materials for the two plastic films in such a way that the metallized film obtains a low coefficient of thermal expansion so as to minimize the dependence of the microphone sensitivity on temperature, and that the electrostatically polarized film, i.e., the electret film, obtains a high resistivity in order to maximize the life time of the microphone. These material characteristics, which are extremely difficult — not to say impossible — to combine in one material, are best found in, respectively, polyester and teflon.

Another advantage of the electret microphone according to the invention is that the number of coincident mechanical contact points, formed by surface irregularities between the fixed and the movable electrode, is less than usual and that the gap obtained between the electrodes is more evenly distributed in their surface plane than in the earlier known electret microphone, so reducing the mechanical distortion of the microphone.

The invention will now be described with reference to the accompanying drawing which shows an electret microphone in accordance with the invention.

The microphone comprises a fixed electrode consisting of a metallic base plate 1, a movable electrode constituting a first diaphragm 2, and an electret film located between the two electrodes and constituting a second diaphragm 3. The diaphragms 2 and 3 are so arranged that they function in cascade in an oscillating movement of the diaphragms caused by acoustic waves, and they consist, respectively, of a metallized polyester film and of an electrostatically polarized teflon film. Owing to the low coefficient of thermal expansion of the polyester film, approx. $27 \times 10^{-6}/°C$, the sensitivity of the microphone is relatively independent of the temperature, while the very high resistivity, $2 \cdot 10^{16} \Omega m$, of Teflon implies that its polarization charges diminish very slowly with time, so that the microphone obtains a long life.

The electret microphone according to the invention has a conventional casing 4 with acoustic openings 5. The fixed electrode 1 is formed in the known manner so as to have air channels 6. The intention is that acoustic waves enter through the openings 5 and actuate the separate diaphragms 2 and 3 functioning in cascade, whereupon a signal voltage is generated between an electrical lead 7 connected to the fixed electrode 1 and another electrical lead 8 connected to a movable electrode 2. The lead 7 has a part formed as a spring resting against the fixed electrode 1.

In respect to the dependence of the microphone sensitivity on temperature it is specially advisable that the respective materials in the fixed electrode 1 and the movable electrode 2 have substantially equal coefficients of thermal expansion.

Certain deviations from the embodiment described and preferred for the invention are conceivable within the scope of the invention. For example, apart from the described electret film, one or more additional plastic films can be inserted between the fixed electrode 1 and the movable electrode 2 to constitute diaphrams of the electret microphone and to reduce its mechanical distorsion to a fixed value.

I claim:

1. Procedure for manufacture of an electret microphone comprising a fixed electrode and a movable electrode, the movable electrode comprising a first plastic film which is metallized and a second plastic film which is electrostatically polarized, the procedure consisting of a first processing stage in which said first and second plastic films are metallized and polarized respectively and a second processing stage in which said metallized plastic film, said polarized plastic film and said fixed electrode are assembled together.

2. Procedure according to claim 1, wherein said first plastic film is chosen in respect to the criterion of having substantially the same coefficient of thermal expansion as said fixed electrode while said second plastic film is chosen in respect to the criterion of having a high resistivity.

* * * * *